United States Patent
Studer et al.

(10) Patent No.: US 9,547,638 B2
(45) Date of Patent: Jan. 17, 2017

(54) DATA LOGGING FOR RULE SPECIFICATIONS

(75) Inventors: Scott Studer, Georgetown, MA (US); Joel Gould, Winchester, MA (US); David Phillimore, Acton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 754 days.

(21) Appl. No.: 12/495,316

(22) Filed: Jun. 30, 2009

(65) Prior Publication Data

US 2009/0327196 A1    Dec. 31, 2009

Related U.S. Application Data

(60) Provisional application No. 61/077,022, filed on Jun. 30, 2008.

(51) Int. Cl.
*G06N 5/02* (2006.01)
*G06F 17/24* (2006.01)
*G06F 9/44* (2006.01)
*G06Q 10/10* (2012.01)

(52) U.S. Cl.
CPC .............. *G06F 17/246* (2013.01); *G06F 8/00* (2013.01); *G06Q 10/10* (2013.01)

(58) Field of Classification Search
CPC .......................................... G06N 5/02
USPC ............................. 706/45; 707/200
See application file for complete search history.

(56) References Cited

U.S. PATENT DOCUMENTS

| | | | |
|---|---|---|---|
| 5,615,359 | A | 3/1997 | Yung |
| 5,734,886 | A | 3/1998 | Grosse et al. |
| 5,832,497 | A | 11/1998 | Taylor |
| 5,848,393 | A | 12/1998 | Goodridge et al. |

(Continued)

FOREIGN PATENT DOCUMENTS

| | | |
|---|---|---|
| CN | 1659589 | 8/2005 |
| CN | 101208695 | 6/2008 |

(Continued)

OTHER PUBLICATIONS

International Search Report & Written Opinion in PCT application No. PCT/US09/49299 mailed Aug. 12, 2009, 7 pages.

(Continued)

*Primary Examiner* — Stanley K Hill
*Assistant Examiner* — Ola Olude Afolabi
(74) *Attorney, Agent, or Firm* — Occhiuti & Rohlicek LLP

(57) ABSTRACT

At least one rule specification is received for a graph-based computation having data processing components connected by linking elements representing data flows. The rule specification defines rules that are each associated with one or more rule cases that specify criteria for determining one or more output values that depend on input data. A transform is generated for at least one data processing component in the graph-based computation based on the received rule specification, including providing an interface for configuring characteristics of a log associated with the generated transform. At least one data flow is transformed using the generated transform, including: tracing execution of the data processing components in the graph-based computation at run time, generating log information based on the traced execution according to the configured log characteristics, and storing or outputting the generated log information.

43 Claims, 5 Drawing Sheets

(56) References Cited

U.S. PATENT DOCUMENTS

| | | | |
|---|---|---|---|
| 5,966,072 | A | 10/1999 | Stanfill et al. |
| 6,477,520 | B1 | 11/2002 | Malaviya et al. |
| 6,728,879 | B1 | 4/2004 | Atkinson |
| 6,782,374 | B2 | 8/2004 | Nichols |
| 7,020,869 | B2 | 3/2006 | Abrari et al. |
| 7,164,422 | B1 | 1/2007 | Wholey, III et al. |
| 7,215,637 | B1 | 5/2007 | Ferguson et al. |
| 7,461,042 | B2 | 12/2008 | Long et al. |
| 7,565,642 | B2 | 7/2009 | Moore et al. |
| 7,756,873 | B2 | 7/2010 | Gould et al. |
| 7,849,075 | B2 | 12/2010 | Gould et al. |
| 8,032,501 | B2 | 10/2011 | Bone et al. |
| 8,064,672 | B2 | 11/2011 | Narayanan et al. |
| 8,069,129 | B2 | 11/2011 | Gould et al. |
| 8,073,801 | B1 | 12/2011 | von Halle et al. |
| 8,086,553 | B2 | 12/2011 | Bone et al. |
| 8,122,367 | B2 | 2/2012 | Krieger et al. |
| 8,190,562 | B2 | 5/2012 | Sanghvi et al. |
| 8,301,413 | B2 | 10/2012 | Napolin et al. |
| 8,332,740 | B2 | 12/2012 | Graham |
| 8,347,207 | B2 | 1/2013 | Borgsmidt et al. |
| 8,380,651 | B2 | 2/2013 | Gould et al. |
| 8,386,408 | B2 | 2/2013 | Gould et al. |
| 8,417,678 | B2 | 4/2013 | Bone et al. |
| 8,438,533 | B2 | 5/2013 | Fritzsche et al. |
| 8,468,125 | B2 | 6/2013 | Tarnoff et al. |
| 8,478,706 | B2 | 7/2013 | Gould et al. |
| 8,571,317 | B2 | 10/2013 | Welling et al. |
| 8,595,231 | B2 | 11/2013 | Arends |
| 8,612,404 | B2 | 12/2013 | Bone et al. |
| 8,645,434 | B2 | 2/2014 | Carter et al. |
| 8,725,660 | B2 | 5/2014 | Forman et al. |
| 8,897,563 | B1 | 11/2014 | Welling et al. |
| 8,898,101 | B2 | 11/2014 | Bone et al. |
| 9,298,687 | B2 | 3/2016 | Petrovicky |
| 2002/0049777 | A1 | 4/2002 | Terayama et al. |
| 2003/0120593 | A1 | 6/2003 | Bansal et al. |
| 2004/0034848 | A1 | 2/2004 | Moore et al. |
| 2004/0085357 | A1 | 5/2004 | Childress et al. |
| 2004/0088196 | A1 | 5/2004 | Childress et al. |
| 2004/0210661 | A1 | 10/2004 | Thompson |
| 2005/0038764 | A1 | 2/2005 | Minsky et al. |
| 2005/0049924 | A1 | 3/2005 | DeBettencourt et al. |
| 2005/0086360 | A1 | 4/2005 | Mamou et al. |
| 2005/0246686 | A1 | 11/2005 | Seshadri et al. |
| 2006/0089923 | A1 | 4/2006 | Kerisit |
| 2006/0095466 | A1 | 5/2006 | Stevens et al. |
| 2006/0095832 | A1 | 5/2006 | Serra et al. |
| 2006/0112061 | A1 | 5/2006 | Masurkar |
| 2006/0256014 | A1 | 11/2006 | Sengupta et al. |
| 2006/0294150 | A1* | 12/2006 | Stanfill et al. ............... 707/200 |
| 2007/0021995 | A1 | 1/2007 | Toklu et al. |
| 2007/0050340 | A1 | 3/2007 | von Kaenel et al. |
| 2008/0059436 | A1 | 3/2008 | Crocker |
| 2008/0140602 | A1 | 6/2008 | Roth et al. |
| 2008/0256014 | A1 | 10/2008 | Gould et al. |
| 2008/0301155 | A1 | 12/2008 | Borgsmidt |
| 2009/0319832 | A1 | 12/2009 | Zhang |
| 2012/0059784 | A1 | 3/2012 | Gould et al. |
| 2012/0066549 | A1 | 3/2012 | Gould et al. |
| 2012/0209800 | A1 | 8/2012 | Nayak |
| 2012/0324462 | A1 | 12/2012 | Miljanic |

FOREIGN PATENT DOCUMENTS

| | | |
|---|---|---|
| CN | 101438280 | 5/2009 |
| JP | 01-296354 | 11/1989 |
| JP | H01-277939 | 11/1989 |
| JP | H02-275539 | 11/1990 |
| JP | 04-352029 | 12/1992 |
| JP | 07-334371 | 12/1995 |
| JP | 2001-100999 | 4/2001 |
| JP | 2002-157262 | 5/2002 |
| JP | 2003-99855 | 4/2003 |
| JP | 2003-208307 | 7/2003 |
| JP | 2004-227396 | 8/2004 |
| JP | 2005-038253 | 2/2005 |
| JP | 2005-122509 | 5/2005 |
| WO | WO 01/86592 | 11/2001 |

OTHER PUBLICATIONS

International Search Report & Written Opinion issued in PCT Application No. PCT/US10/22593, mailed Mar. 12, 2010, 8 pages.

ILOG, "Enrich the Decisioning of Your COBOL Applications," Jun. 2008, pp. 3-8.

Affidavit Pursuant to 37 CFR 1.56 signed by Craig W. Stanfill on Sep. 23, 2009, 2 pages.

"ILog JRules: Leading the Way in Business Rule Management Systems," White Paper. *ILog Business Rules*, Mar. 2005, 15 pages.

ILOG JRules Performance Analysis and Capacity Planning, ILOG Business Rules Product Management, Version 1.0, Sep. 2005, 16 pages.

Owen, James. "Clash of the Java rule Titans," InfoWorld <http://www.infoworld.com>, Jul. 17, 2006, 4 pages.

PCT International Search Report and Written Opinion dated Jul. 9, 2008. International Application No. PCT/US2008/058360, 14 pages.

Japanese Office Action, with English Translation, JP Application No. 2010-503118, Aug. 30, 2012, 8 pages.

Barakat, Nahla and Andrew P.Bradley, "Rule Extraction from Support Vector Machines: Measuring the Explanation Capability Using the Area under the ROC Curve," A.P. Pattern Recognition, pp. 8112-8815 (2006).

Mukhopadhyay et al., "A Product Recommendation System using Vector Space Model and Association Rule", Rana Information Technology, pp. 279-282 (2008).

Korel et al., "Data Dependence Based Testability Transformation in Automated Test Generation," Software Reliability Engineering, 2005, ISSRE 2005, 16$^{th}$ IEEE International Symposium on DOI, 10 pages (2005).

Icke, Ilknur and Andrew Rosenberg, "Automated Measures for Interpretable Dimensionality Reduction for Visual Classification: A User Study," Visual Analytics Science and Technology (VAST), pp. 281-282 (2011).

Hamaneh et al., "Automated Removal of EKG Artifact From EEG Data Using Independent Component Analysis and Continuous Wavelet Transformation," IEEE Transactions on Biomedical Engineering, vol. 61, No. 6, pp. 1634-1641 (2014).

Saqib et al., "Automated Optimization of Data-Path Design by Improving Circuit Area and Critical Time through Adaptive Transformation," Intelligent System and Design Applications, pp. 1493-1498 (2010).

International Search Report and Written Opinion, PCT/US2014/057336, mailed May 28, 2015 (10 pages).

Chinese Office Action, with English translation, CN Application No. 200980133372.9, mailed Dec. 9, 2013, 16 pages.

Japanese Office Action, with English Translation, JP Application No. 2013-155253, Jun. 25, 2014, 5 pages.

Barakat, Nahla and Andrew P.Bradley, "Rule Extraction from Support Vector Machines: Measuring the Explanation Capability Using the Area under the ROC Curve," A.P. Pattern Recognition, pp. 8112-815 (2006).

Liu et al., "A Vector Operation Based Fast Association Rules Mining Algorithm," Bioinformatics, System Biology and Intelligent Computing, pp. 561-564 (2009).

Zhang et al., A New Association Rules Mining Algorithm Based on Vector, Genetic and Evolutionary Computing, pp. 429-432 (2009).

Transaction History, U.S. Appl. No. 12/696,667, Jul. 31, 2013, 2 pages.

Transaction History, U.S. Appl. No. 11/733,434, Jul. 31, 2013, 2 pages.

Transaction History, U.S. Appl. No. 13/295,701, Jul. 31, 2013, 2 pages.

Transaction History, U.S. Appl. No. 13/295,760, Jul. 31, 2013, 3 pages.

(56) References Cited

OTHER PUBLICATIONS

Transaction History, U.S. Appl. No. 13/601,416, Jul. 31, 2013, 1 page.

* cited by examiner

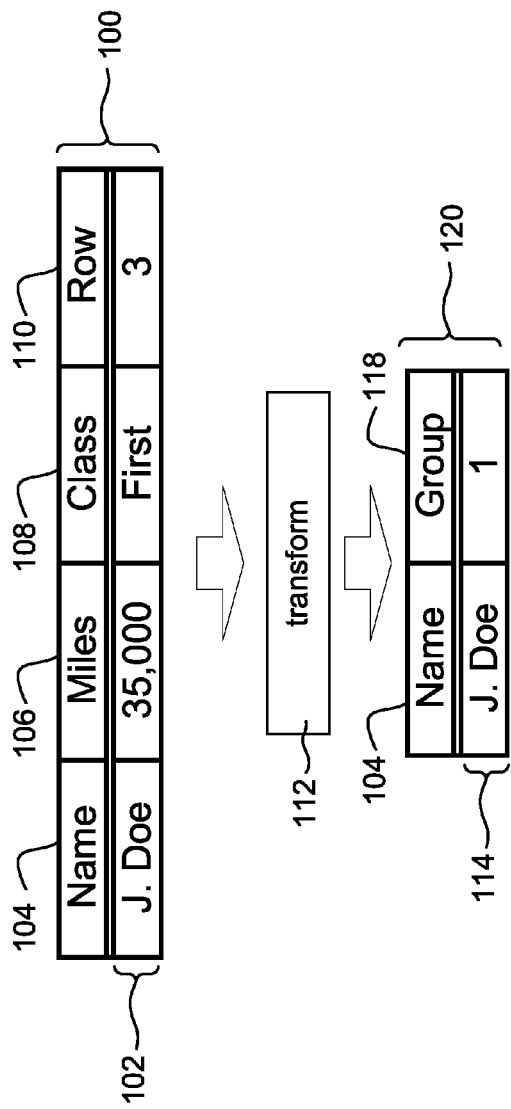
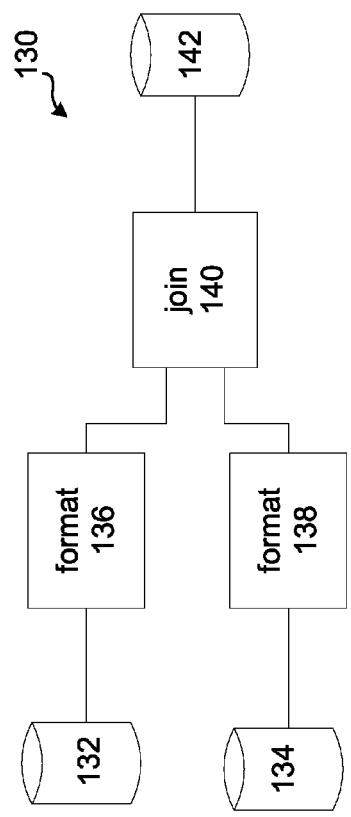

| | 202 | 204 | 206 | 208 | 212 |
|---|---|---|---|---|---|
| | Total frequent flyer miles | Current year frequent flyer miles | Class of seat | Row of seat | Boarding Group |
| 210a | >= 1,000,000 | | | | 1 |
| 210b | | | first | | 1 |
| 210c | >= 100,000 | >= lat year frequent flyer miles | | | 2 |
| 210d | | | business | | 2 |
| 210e | | | else | <= 10 | 2 |
| 210f | | | same | <= 40 | 3 |
| 210g | | | same | <= 50 | 4 |
| 210h | | | same | else | 5 |

| Expression | Boarding Group |
|---|---|
| Total frequent flyer miles >= 1,000,000 | 1 |

220b

| Expression | Boarding Group |
|---|---|
| Class of seat == first | 1 |

220c

| Expression | Boarding Group |
|---|---|
| Total frequent flyer miles >= 100,000 and Current year frequent flyer miles >= Last year frequent flyer miles | 2 |

220d

| Expression | Boarding Group |
|---|---|
| Class of seat == business | 2 |

220e

| Row of Seat | Boarding Group |
|---|---|
| <= 10 | 2 |
| <= 40 | 3 |
| <= 50 | 4 |
| else | 5 |

Deployment – "Default deployment"

⊟ GENERATE COMPONENT SETTINGS
- Name: [Default deployment]
- Description: [ ]
- Comment: [ ]
- Transform EME Path: [/Projects/Datasets/xfr/example.xfr] [...]
- Component EME Path: [/Projects/Datasets/components/example.mp] [...]
- Target Co>Operating Systems⊙: [<current>] [v]
- Datasets:

| | Type | Name | Dataset |
|---|---|---|---|
| 1 | Input | Input 1 | Dataset 1 |
| 2 | Output | Output | Dataset 1 |

⊟ LOGGING SETTINGS

410 {
Create a log record:
- ⊙ Never
- ○ For each input record
- ○ When an error occurs
- ○ When this expression is True:
[ ]
}

420 {
Include in each log record:
- ☐ Rule case firings (recommended)
- ☐ Input values
- ☐ Output values
- ☐ Lookup values
- ☐ Output values from included rulesets
- ☐ Parameter values
- ☐ Result of evaluating each cell (not recommended)
}

⊟ FILE TEST SETTINGS

Input Data:

| Name | Kind | Location |
|---|---|---|
| Input 1 | File | |

Baseline Data:

| Name | Kind | Location |
|---|---|---|
| <Output> | File | |

Sandbox: [ ] [...]

Fig. 4

DATA LOGGING FOR RULE SPECIFICATIONS

CROSS-REFERENCE TO RELATED APPLICATIONS

This application claims priority to U.S. Application Ser. No. 61/077,022, filed on Jun. 30, 2008, incorporated herein by reference.

TECHNICAL FIELD

This description generally relates to data logging in graph-based computations.

BACKGROUND

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. In some cases, the computations associated with a vertex is described in human-readable form referred to as "business rules."

SUMMARY

In one aspect, in general, a method includes receiving at least one rule specification for a graph-based computation having data processing components connected by linking elements representing data flows, the rule specification defining rules that are each associated with one or more rule cases that specify criteria for determining one or more output values that depend on input data; generating a transform for at least one data processing component in the graph-based computation based on the received rule specification, including providing an interface for configuring characteristics of a log associated with the generated transform; and transforming at least one data flow using the generated transform, including: tracing execution of the data processing components in the graph-based computation at run time, generating log information based on the traced execution according to the configured log characteristics, and storing or outputting the generated log information.

Aspects can include one or more of the following features.

Configuring characteristics of the log includes selecting at least one event for which log information is to be generated.

The at least one event is associated with transforming records in the data flow according to a rule associated with the received rule specification.

The at least one event includes identifying an error in a record to be transformed.

The at least one event includes satisfying a condition of a rule case for a given record.

Satisfying a condition of the rule case for a given record includes satisfying a logical expression based on values in the given record.

Satisfying a condition of a rule case for a given record includes comparing values in the record to values associated with the rule case.

Generating log information includes: generating one or more legend log messages each including details of a rule set containing the rules defined by the received rule specification, and generating multiple tracing log messages, where each tracing log message is associated with a legend record and describes at least one event associated with transforming records in the data flow according to a rule associated with the received rule specification.

A tracing log message that describes the event describes at least one input or output of a data processing component using an index in the legend record.

Generating one or more legend messages includes generating one legend message per execution of a graph-based computation.

The data processing component that uses the generated transform transforms input records in the data flow according to a first rule associated with the received rule specification.

Generating log information based on the traced execution includes generating a log message for each rule case of the first rule for which the specified criteria are satisfied.

Generating log information based on the traced execution includes generating a log message is for each value in a transformed record generated by the data processing component using the generated transform.

Storing or outputting the generated log information includes outputting log messages from a log port of one or more of the data processing components.

Storing or outputting the generated log information further includes receiving a data flow of log messages from the log port in a data processing component and storing log information derived at least in part from the log messages.

The method further includes filtering the received data flow of log messages and storing log information derived from a subset of the log messages.

Storing or outputting the generated log information further includes: receiving a data flow of log messages from the log port in a data processing component that indicate triggered rule cases for which the specified criteria are satisfied, examining the log messages to determine a reduced set of input records that provide at least one log message for each rule case of each of the rules defined by the rule specification that is triggered by all of the input records, and storing the reduced set of input records.

In another aspect, in general, a computer system includes a storage system storing at least one rule specification for a graph-based computation having data processing components connected by linking elements representing data flows, the rule specification defining rules that are each associated with one or more rule cases that specify criteria for determining one or more output values that depend on input data; a generator configured to generate a transform for at least one data processing component in the graph-based computation based on the received rule specification, including providing an interface for configuring characteristics of a log associated with the generated transform; and a graph-based computation system configured to transform at least one data flow using the generated transform, including: tracing execution of the data processing components in the graph-based computation at run time, generating log information based on the traced execution according to the configured log characteristics, and storing or outputting the generated log information.

In another aspect, in general, a computer program is stored on a computer-readable medium, the computer program including instructions for causing a computer system to: receive at least one rule specification for a graph-based computation having data processing components connected by linking elements representing data flows, the rule specification defining rules that are each associated with one or more rule cases that specify criteria for determining one or more output values that depend on input data; generate a transform for at least one data processing component in the graph-based computation based on the received rule specification, including providing an interface for configuring characteristics of a log associated with the generated transform; and transform at least one data flow using the generated transform, including: tracing execution of the data processing components in the graph-based computation at run time, generating log information based on the traced execution according to the configured log characteristics, and storing or outputting the generated log information.

In another aspect, in general, a computer system includes: means for receiving at least one rule specification for a graph-based computation having data processing components connected by linking elements representing data flows, the rule specification defining rules that are each associated with one or more rule cases that specify criteria for determining one or more output values that depend on input data; means for generating a transform for at least one data processing component in the graph-based computation based on the received rule specification, including providing an interface for configuring characteristics of a log associated with the generated transform; and means for transforming at least one data flow using the generated transform, including: tracing execution of the data processing components in the graph-based computation at run time, generating log information based on the traced execution according to the configured log characteristics, and storing or outputting the generated log information.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A illustrates transforming input data into output data in a graph-based computation environment.

FIG. 1B illustrates an example of a graph in a graph-based computation.

FIG. 2A illustrates an example of spreadsheet-based rule entry.

FIG. 2B illustrates an example of an individual rule.

FIG. 4 is an illustration of a graphical user interface of logging configuration in a graph-based computation environment.

DETAILED DESCRIPTION

Figure 1C:
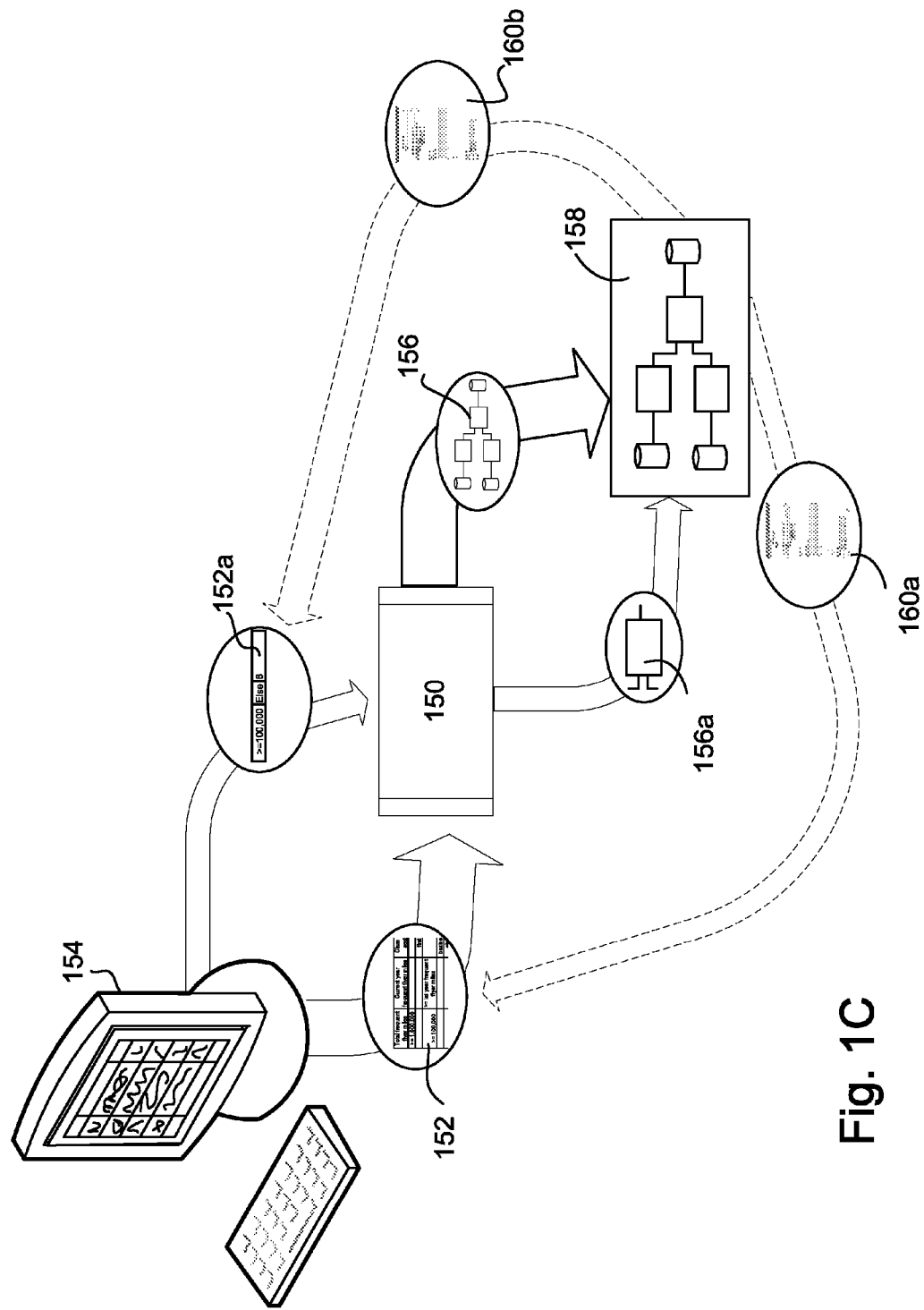
FIG. 1C illustrates a block diagram of transform generation with logging information.

An exemplary context for a data logging and auditing mechanism includes a graph-based computing paradigm that stores metadata associated with graph-based computations in a graph-based computing system. Each computer program, in this context, is implemented using a computation graph, also called a dataflow graph, or simply a graph. A graph includes one or more nodes or vertices representing data processing components, joined by directed edges representing flows of data between the components. The graphs can run in a parallel processing environment. The system tracks changes in development of graphs, performs statistical and dependency analysis, and manages metadata pertaining to the development of graphs. The storage of graph related metadata allows for data impact analysis to occur, giving the user a visual sense of how the data is changing as it is processed in a graph, and the impacts those changes have on another graph. Additionally, the system provides configuration/change management allowing multiple versions of a graph to be stored as there are code changes thereby ensuring the latest code and data are available.

Business rules, as a subset of metadata, are stored in the system. Various aspects of business rules are described, for example, in U.S. application Ser. No. 11/733,434, incorporated herein by reference. Each business rule can be stored in a separate object. A business rule can be expressed as a set of criteria for converting data from one format to another, making determinations about data, or generating new data based on a set of input data. For example, in FIG. 1A, a record 102 in a flight reservation system includes values for fields that indicate the name 104 of a passenger, how many miles 106 the has flown this year, the class 108 of his ticket, and the row 110 he is seated in. A business rule indicates that such a passenger should be put in boarding group 1. A business rule is generally easy for a human to understand, i.e., "first class passengers are in group 1," but may need to be translated into something a computer can understand before it can be used to manipulate data.

To implement business rules in a graph-based computation environment, a transform 112 is generated which receives input records, such as record 102, from one or more data sources, e.g., input dataset 100, and provides an output record, e.g., record 114, indicating the passenger's name 104 and which group he is in 118 for an output dataset 120. In this example, the datasets are illustrated showing an exemplary record, but in general the datasets may include any number of records. Input and output datasets can be processed as data streams, for example, as the data making up the datasets flow into or out of a graph.

The transforms may then be implemented in graph-based computations having data processing components connected by linking elements representing data flows. For example, the simple computation graph 130 of FIG. 1B takes as input two data sets 132, 134 (for example, frequent flier data and flight reservation data), formats the data in each set in separate format components 136, 138 so they can be used together, and joins them in join component 140 to produce an output data set 142. A transform may itself be a graph-based computation, such as that in the graph 130, or may be implemented within a component of a graph, such as the individual components 136, 138, and 140 of which the graph 130 is composed.

To simplify creation of transforms for non-technical users, a tool is provided for such users to input a set of business rules, referred to as a rule set, in a format with which they are familiar, that tells the computer system what they want the transform to do. A rule set is the set of rules that produce a single transform. A rule may be composed of one or more rule cases that determine different values for the rule's output depending on the input. A rule may also include other rules. Other rules in a rule set may produce values for additional or alternative outputs. A rule set may contain other rule sets, which is referred to as "included" rule sets.

A general model of the transform generation system with logging information is shown in FIG. 1C. A business rules environment (BRE) includes a generator 150 that receives as input a rule set 152 from an editor 154 and generates a transform 156. As one of the transform generation options, logging can be subsequently activated by customizing various logging events and information in a graphical user interface. A log is a record of the events occurring within an organization's systems and networks. Logs are composed of entries; each entry contains information related to a specific event that has occurred within a system or network. Logs can be used for troubleshooting problems, and to serve many functions, such as optimizing system and network performance, recording the actions of users, and providing data useful for investigation abnormal activity. Logs can contain information related to many different types of events. The generated transform 156 may be provided to a graph-based computation system 158 as a component to be used in a graph or as an entire graph itself, depending on the system's architecture and the purpose of the transform and the business rules. The generator 150 may be, for example, a compiler, a custom-built program, or another graph-based computation configured using standard tools to receive the rule set 152 and output the transform 156.

The generator 150 may also update the transform 156 when the rule set 152 is edited. When the rule set 152 is edited, the editor 154 may provide the entire rule set to the editor or it may provide only the new or modified rules or rule cases 152a. The generator 150 may generate an entirely new transform to replace the original transform 156, or it may provide a component 156a containing the transform, depending on the capability and needs of the system using the transform.

There is no need for a separate, dedicated execution engine to perform logging operations during the graph-based computation 158. The logging can be configured to occur using functions called by the graph components as they are executed. For different logging configurations, different auditing reports on rule execution can be provided. For example, as shown in FIG. 1C in dashed arrows (not the actual data flow shown by the solid arrows), log 160a may trace back to a particular input record in the rule set 152; while log 160b may reflect a specific rule case 152a has been fired at a prior time.

Referring to FIG. 2A, in some examples, a rule can be entered in a spreadsheet format. Trigger columns 202, 204, 206, 208 in spreadsheet 200 correspond to available data values, and rows 210a-h correspond to rule cases, i.e., sets of criteria that relate the available data values. A rule case 210n applies to a given record (e.g., 102 in FIG. 1A) if the data values of that record, for each trigger column in which the rule case has criteria, meets the triggering criteria. If a rule case 210n applies, output is generated based on one or more output columns 212. A rule case that has all of its triggering criteria satisfied may be referred to as "triggered." Each output column 212 corresponds to a potential output variable, and the value in the corresponding cell of the applicable row 210n determines the output, if any, for that variable. The cell could contain a value that is assigned to the variable or it could contain an expression that must be evaluated to generate the output value, as discussed below. There may be more than one output column, though only one is shown in FIG. 2A.

There may be several different types of trigger columns, including columns that correspond to a variable, columns that contain expressions but are calculated once and then treated like variables, and columns that only contain expressions. Other column types include columns that only contain data and columns that specify an expression to evaluate for every row, based on the columns that only contain data. Columns that only contain expressions are simpler than those corresponding to or treated as variables.

In the example of FIG. 2A, the first row 210a has criteria in only one column, 202, which indicates that if the total number of frequent flier miles for a traveler is greater than 1,000,000, then that rule case applies regardless of what value any other columns may have. In that case, the "Boarding Group" output variable for that user is set to group 1. Likewise, the second rule case 210b indicates that any flier in first class is in group 1. In some examples, the rules are evaluated in order, so a traveler having over 1,000,000 miles and a first class ticket will be in group 1, but only the first rule case 210a will be triggered. Once a rule case is triggered, the other rule cases in that rule do not need to be evaluated.

The next rule case 210c is based on two input values 202 and 204—if the criteria defined for both total frequent flier miles and current-year miles are met, then the flier is in group 2. In a fourth rule case 210d, any business class customers are also in group 2. The remaining rule cases 210e-h contain criteria that relate to the other rule cases, i.e., "else" and "same." "Else" indicates that none of the criteria in that column were met in rows that were above that one and which had the same criteria to the left (i.e., rules 210b and 210d), while "same" indicates that the rule case applies if the rule case above it applied with respect to that column. Thus, the fifth rule case 210e applies to any record that didn't match any criteria in the first two columns 202 or 204 (because it would have been handled by rule cases 210a or 210c), didn't have "first" or "business" in the "class of seat" column (the "else" keyword in column 206), and which has a "row of seat" value 208 less than or equal to 10. Each of the remaining rule cases 210f-h applies to records that also didn't match any higher rule case with values in columns 202 or 204, didn't have "first" or "business" in the "class of seat" column, and which have the appropriate "row of seat" value.

The rule cases 210a-h in the example of FIG. 2A can also be represented as individual simple rules, each in their own spreadsheet, as shown in FIG. 2B. Rules 220a-d correspond to rows 210a-d of FIG. 2A, respectively, while rule 220e has four rule cases corresponding to rows 210e-h together. A user could create these individual rules separately, rather than generating the entire table shown in FIG. 2A. Each rule case contains a value for every trigger column and a value for every output column (the value can be blank, i.e., effectively set to "any"). When multiple rules generate the same output, the rules are ordered and they are considered in order until a rule case in one rule triggers on the inputs and generates an output. If no rule case in a rule triggers, the next rule that produces the same output is processed. If no cases in any rule trigger for an output, a default value is used.

In some examples, the editor interface 150 may graphically identify cells that contain expressions. This will help the user understand the difference between an expression that will be evaluated to true or false on its own and an expression that returns a value that is compared against the column variable. When the user is typing, he can indicate that a particular cell is to be an expression cell by, for example, typing an asterisk at the beginning.

For columns that correspond to output variables, the cells can contain one of the following:
- A value. The value that will be assigned to the output variable.
- An expression. The value of the expression is assigned to the output variable. If the expression evaluates to NULL then the field gets the NULL value, unless the output field is not-nullable. In which case, an error is generated.
- The keyword "null." If the output field is nullable, then the field will be assigned NULL. Otherwise, an error is generated.

An empty string. If the output field has a default value, then the default value is assigned. Otherwise, the cell is treated as if it contains the keyword "null."

The keyword "same." The output field is assigned the same value computed in the cell above.

If possible, errors are reported upon being detected, i.e., putting "null" in an output column for a non-nullable field. However, some errors cannot be reported until either test time or run time.

Whether created as rows of a table or as individual rules, each rule has a certain set of attributes. Rule sets may determine these attributes for the rules they include. These attributes may include a name, a rule type, a description and comment field, a list of output variables, a list of input variables, a list of arguments, a list of trigger columns, a modification history, a test dataset, and an error handling behavior. A name is self-explanatory, and is used for listing the rule in a rule set. In some examples, the rule type is a property of the rule set. The list of output variables is the set of variables produced or assigned values by the rule. This may be inherited from the rule set, and there can be one or more outputs. The list of input variables identifies all the variables that the rule needs to evaluate a record, including those at the top of the columns and those used inside expressions (for example, the "last year frequent flyer miles" value used in rule 210c in FIG. 2A is used in an expression but does not have its own column).

Rules can be single-fired or multi-fired. For example, multiple rule cases may be used to generate multiple values for one or more outputs. A rule that can trigger multiple rule cases is referred to as a multi-fire rule. A multi-fire rule is identified solely based on the type of output computed by that rule. If the output(s) computed by a rule are lists (outputs that can have multiple values in each record), then the rule is a multi-fire rule.

In a multi-fire rule, once a rule case is triggered, the corresponding output value is appended to the list of values for the output. However, unlike single-fire rules, in a multi-fire rule, evaluation continues even after a rule case is triggered. Each subsequent rule case is also evaluated, and every rule case that triggers will cause another value to be appended to the list of values for the output(s).

In some examples, rules may be evaluated in a manner converse to that described above, with rule cases in rows being ANDed and columns being ORed. That is, a rule produces an output only if every row triggers (ANDing the rows) but only a single cell needs to be true for each row to trigger (ORing the columns).

The list of arguments is only present for function rules. It identifies the names and types of parameters that are inputs to the rule, and may be a property of the rule set. The list of trigger columns identifies which columns may trigger application of the rule. Beyond just the input variables shown in the example of FIGS. 2A and 2B, trigger columns could correspond to parameters, lookup variables, output variables from an earlier rule, output variables of included rule sets, parameters to the rule set, or expressions. They may also include input variables from function rules, i.e., arguments.

Error handling determines how the transform created from the rule set handles errors that occur when evaluating a rule. For handling errors in a trigger expression, the options are to allow the error, in which case the transform rejects the record that caused the error, or to ignore an error, which is equivalent to assuming the trigger expression to be false and moving on to the next rule. For output expressions, errors can be handled by allowing the error and rejecting the record, ignoring the error and setting the output to NULL, or ignoring the row in the rule and moving on to the next row.

As noted above, a transform is generated from a rule set. A rule set may have the following attributes:

A name, description, and comments—these identify a rule set. Depending on the back-end implementation, a rule set may include an identification of its location within the system. In some examples, a rule set's location is a path in a project. In some examples, rule sets may be organized in a relational database and located by name. A modification history includes modification names, dates, and check-in comments.

A transform type—this determines what type of transform is generated from the rule set. Possible values include reformat, join, rollup, and filter, as discussed below.

Input datasets—these provide a list of fields and named constants for editing. In some examples, when the transform is generated it will assume the record format of one of the input datasets by default. There may be multiple input datasets, allowing the rule set to generate transforms for different environments. This also allows multiple sets of logical to physical mappings, i.e., different sets of physical names. In some examples, there is an input mapping table with one or more datasets. In some examples, a join component may have multiple input mapping tables, and each may have multiple datasets.

Output datasets—these provide a list of output field names. By default, when the transform is generated it will assume the record format of one of the output datasets. The output dataset can be the same as the input dataset. Included rule sets will not have an output dataset. In some examples, as with input datasets, there are multiple output datasets, allowing the rule set to generate transforms for different environments.

A list of included rule sets—one rule set can use the output fields computed by another rule set (explicitly listed output fields, not fields of the output record format). Output variables in the included rule sets may be used as variables in the including rule set, based on an included rule set mapping table that defines the set of output variables from an included rule set that are visible in the including rule set.

A list of included transform files—one or more files that specify transforms to be used when processing a rule set can optionally be included.

A series of mapping tables that list the variables and constants—these tables are intertwined with the input and output datasets. They make the list of variables known to the editor and document the mapping between business names and technical names. Each variable has a business name, technical name (which can be computed using expressions), and base type (string, number, date or datetime). Associated with each variable is an optional list of constants that documents the mapping between business name and technical name. The variable tables are described in more detail below.

References to external test data files—Test files are used for testing the rules, similarly to the embedded test datasets discussed above.

A No-reject flag—if this flag is set, then the transform produced by the rule set will not reject records (throw errors). This may be used so that a rule that throws an error will be ignored, as if that rule never triggered.

A deployment table—this lists one or more deployments, which indicate (indirectly) which rules should be included in each build. The deployment table is described in more detail later.

An optional key—this allows users to specify the business name of a special input field that represents the key for join-type and rollup-type rule sets. In some examples, the key is actually implemented as an entry in the table of input variables, with a type of key.

An optional list of lookup files—this provides business names, key information and a complete table of input variables and constants, one table per lookup file. Lookup file support is described in more detail below.

A table of parameters—this lists variables whose value comes from the environment or from a parameter set at run time.

A rule set is associated with several different tables:
1. A table of input variables and constants. For transform-type rule sets, this table contains the fields in the input record format that will be referenced in the rules. Not every field in the record format needs to be listed, but they usually are. With a Join-type rule set, there will be multiple input tables, with each table representing one input dataset for the join operation.
2. A table of input variables and constants for all included rule sets. When using included rule sets, each included rule set has its own table of input variables and constants. When a transform is built, the input variables used by included rule sets are mapped to actual inputs in the context of the rule set doing the including. Therefore, this list is promoted to the including rule set. If multiple included rule sets are included, each input variable table is promoted. (If an included rule set itself includes a rule set, the second-level variables are not promoted.) Input variables and constants promoted from included rule sets are not available for use in the including rule set. This table is included so a mapping can be established between the inputs to the included rule sets and the inputs to the including rule set. See below for more detail.
3. A table of output variables and constants for all included rule sets. When rule sets have been included, the outputs of those included rule sets become inputs to the including rule set. This table lists all those variables. It is initially populated directly from the table of output variables and constants in all the included rule sets; however, the business names can be changed to avoid name collision. For this table, the technical name is the business name inside the included rule set.
4. A table of output variables and constants. For transform-type rule sets, this table contains the fields in the output record format that will be calculated by the rule set. Output variables that are not calculated can also be included and will be ignored by the rule set. (The generated transforms have a wildcard rule to copy inputs to outputs. In addition, the outputs could have default values included.)
    Output variables can also be used as intermediate variables, meaning the value of an output produced from one rule can be referenced in a later rule. Sometimes the output is used in this way and is not directly included in the output record from the transform.
5. A table of parameters. Rules may include references to parameters. Parameters are resolved at run time in the context of a graph's parameter set. Similar to other variables, in a rule set a parameter has a business name, a technical name (e.g., $RUNDATE) and a type.
6. A table of variable mappings for each lookup file. These are similar to the input tables, but map to fields in the record format for the lookup file.

Non-shared rule sets (which are designed to produce transforms) are usually tied to both input and output datasets. The input dataset is the source of input variables. The output dataset is the source of output variables. Sometimes a rule set will have multiple input datasets and/or multiple output datasets. In that case, each input dataset and output dataset is a possible input or output of the transform. There may only be one set of input variables (except for join operations), but there may be a different mapping between business names and technical names for the different datasets. In some cases, an input variable may be used by the rule set and be present in one input dataset but not in a second input dataset. In that case, an expression is specified as the technical name of the missing variable in the second input dataset. If the rule set does not use an input variable, there is no need to supply a technical name for every input dataset.

Included rule sets are treated somewhat differently. Included rule sets may not have associated input and output datasets. Instead, they have input variables and output variables. The rule set that includes a included rule set is responsible for mapping the input and outputs.

Variables

Variables may have the following properties, and may be presented to the user in a tabular form:
1. The business name (logical name). The business name is the name used in rules. In some examples, restrictions are imposed such that no two input variables can have the same name, no two output variables can have the same name, no two outputs from included rule sets can have the same name, and no two lookup variables in the same lookup file can have the same name. An input variable can have the same name as an output variable. In such a case, the user interface may disambiguate the input and output based on context or by using a prefix such as "out." in front of the output variable name. Lookup variables in different lookups file can have the same name. Therefore, using a prefix such as the name of the lookup file itself will disambiguate them.
2. A simple type. In some examples, four basic types may be supported—string, number, date and datetime. These correspond to types string(int), decimal(20), date("YYYY-MM-DD") and datetime("YYYY-MM-DD HH24:MI:SS.nnnnnn"). Conversion between the basic type and the actual type used in the transform will be handled separately from the editing of the business rules, for example, by the generated transform component.
3. A default value. The default value is only needed for output variables. This is the value that is used when (1) there is an empty cell in an output column in a rule for that output, or (2) when no rules trigger to compute a value for that output. Default values can be NULL (and an empty cell is interpreted as NULL), as long as the output variable is nullable.
    Default values are expressions, just like the expressions that are used in output columns in a rule expression table. This means that default values can refer to input variables or output constants or contain expressions. Default values can also refer to other outputs, as long as no circularities are introduced.
4. A technical name (physical name) or expression. This is the expression that specifies the variable. It is possible to use a expression instead of a field name for input and included variables (in some examples, using expressions is not allowed for output variables). In the case of vectors, the expression should be fully qualified.

When dealing with prompted variables and input and output variables from included rule sets, the technical name associated with a variable is really just the business name used inside the shared rule set. When dealing with output variables that are only used internally (intermediate variables computed in one rule and used in a subsequent rule), the technical name can be blank.

5. An optional description and comment.

Constants

The various tables of variables include mapping for constants as well as variables. Constants correspond to enums in C++. The system may support constant values that initially come from valid values and invalid values, and constant ranges that initially come from valid and invalid ranges. Additionally, it is possible to create constants that represent sets of distinct values and/or ranges.

Constants are associated with variables. This means that the business names of constants do not have to be unique across the entire rule set. The editor will normally know the context for any constant based on which column in the rule the constant appears in; however, it is possible for the user to select a constant belonging to a different variable in expressions. In that case, the constant will be qualified with the variable name (e.g., "Airline class.business").

When computing output variables, only single value constants are used (it makes no sense to assign a range to an output field).

Constants have the following properties, and will be presented to the user in a tabular form (variables and constants may be intermingled, similarly to embedding a table inside another table).

1. The variable name. Constants apply to one variable. The variable name is actually part of the associated variable itself.
2. The business name. The business name is the name used in rules. The name does not have to be a value identifier, specifically, internal spaces and punctuation are allowed. In some cases business names for constants are only unique within the variable they apply to.
3. The constant type. One of value, range, or set. As mentioned earlier, ranges and sets are legal when used in comparisons (inputs), not in assignments (outputs).
4. For values: the actual value. In the present example, strings are in quotes and numbers are not. Dates and date-times are in quotes in the default forms (e.g., "YYYY-MM-DD"). Using an expression is also allowed as long as that expression returns a simple type that can be automatically converted to the variable type.
   When a constant is part of the table of inputs or outputs for an included rule set, there is no value. Instead, the value is the business name of the associated constant for the corresponding input or output variable.
5. For ranges: the minimum and maximum values. Both are constants or expressions, just like the actual value documented above. Ranges are used as shorthand for comparison in rules. Only equality comparisons are allowed for ranges, and the system will translate ranges into "variable>=minimum and variable<=maximum". If the minimum is not specified, that part of the comparison will be skipped. Likewise for the maximum. The range is stored with a comma separating the minimum and maximum values.
6. For sets: a comma separated list of the values. Each element of the list is a constant or expression, similar to the actual value documented above. Only equality comparisons are allowed for sets, and the system will translate sets into an expression in the form of "variable member of [vector list of values]".
7. An optional description and comment.

When dealing with promoted variables from shared rule sets, constants are also promoted. In the tables that show the input and output variables for shared rule sets, constants associated with those variables are also shown. The default mapping for those constants is part of the promoted information, but the user can override the constant values.

The system will detect when there is a possible conflict in the use of variables because of mismatching constants. Specifically, if (1) the value of any variable is copied into another variable, (2) if both variables have constants defined, and (3) the set of constants are not identical in both name and value, then an error will be generated that the user needs to translate the value of one variable into the values of the other. Source variables include input variables, lookup variables, outputs from included rule sets, and output variables used as inputs. Target variables include output variables and inputs to included rule sets. Assignment can happen in rule expressions or in variable tables.

Ordering of Variables

To avoid circular logic, the system enforces a strict ordering of variables and rules. An example of a global ordering is as follows:

Input variables and Parameters.
The 1st included rule set's input mappings.
The 1st included rule set's output values.
. . .
The Nth included rule set's input mappings.
The Nth included rule set's output values.
The 1st lookup file's default key values.
The 1st lookup file's output fields.
. . .
The Nth lookup file's default key values.
The Nth lookup file's output fields.
All output variables' default values.

The calculation of each item uses values computed in previous steps. This means, for example, that the first included rule could refer to input variables and parameters in its mapping table. The second included rule, however, could map its inputs to outputs computed from the first included rule. Similarly, the default values for each output variable are computed before any rules, so they are based on the values of input variables, parameters, lookup files, or outputs from any included rules. When it comes time to actually calculate the output of the rules, the rules are evaluated in order so later rules can use the values computed from earlier rules.

Linking Datasets to Variables

In some examples, the table of input variables comes directly from the input dataset record format and the business names come from the metadata on the input dataset. However, in some examples, there are advantages to having a copy of this mapping inside the rule set. First, having a copy of the variables mapping table in the rule set makes it possible to edit the rule set outside the context of the production environment. The rule set and associated rules could be serialized into a sandbox and edited as part of a sandbox project. Second, having a copy of the input variables mapping table makes it possible for the user to resolve conflicts or otherwise override the existing metadata. For example, if two fields in the input dataset map to the same business name, one of those business names could be changed in the table of input variables.

When a rule set is first created, the input variable table is empty. As soon as the user identifies the input dataset, the input variable table is populated, automatically, from the metadata of the input dataset. (The same logic applies to the output variables and output dataset, but the rest of this discussion will focus on the input dataset for simplicity.)

The singular term "input dataset" is used in this description for simplicity. There are zero or more input datasets that can be linked to input variables, and a separate set of zero or more input datasets that can be linked to output datasets. Specifically, the input variable table has one column for the business name, one column for the type, etc. and many columns for the technical names, one per input dataset. Once a single input data set is specified, a second can be added using similar technique. However, in the case of a second or subsequent dataset the mapping between technical name and business name may be less complete, especially since the system may not be able to figure out which variable each field in the second and subsequent dataset maps to. In such examples, the user can manually correct any missing information.

When initially creating the input table from an input dataset, each field in the input dataset will cause one input variable to be created. The technical name for the input variable will be the name of the field. The type will be assigned based on the field type. Voids will be treated like strings, reals will be treated like numbers. Subrecords will not have corresponding input variables, although the fields inside subrecords will. Unions will result in input variables for each branch of the union. If an element is a vector, the technical name of the corresponding input variable will assume the first element of the vector ("in.vect[0]"). The user can override this. For example, for a multi-output transform, the user may change the technical name to be in.vect[index]. Or, the user may create additional input variables corresponding to other elements of the vector, if the vector is fixed length. Unions and vectors may not be supported in output datasets (no output variables will be created for them). In some examples, a variation of the multi-output component may output an output vector instead of multiple output records.

In some examples, the business name is computed from the metadata. An example of the logic for determining the business name for a field is as follows:
  If the field (Physical Element) has a display_name, then the display_name of the field is used as the business name.
  Otherwise, if the field has a Logical Element and the Logical Element has a display_name, the display_name of the Logical Element is used as the business name.
  Otherwise, if the field has a Logical Element, the name of the Logical Element is used as the business name.
  Otherwise, a business name is computed from the technical name.
  If there is a conflict (duplicate name), only one business name will be assigned. The other fields will not be assigned any business name.

In some examples, there is no dynamic linking between rule sets and dataset metadata. If users change the metadata data (for example, renaming a Logical Element), that change is not automatically picked up by the system. In some examples, a two-way relationship between data may be used to allow such changes to be detected.

If a user adds a second dataset to rule set, the system will try to fill in fields for each of the business names using the same physical to logical mapping rules as listed above. If a variable cannot be mapped, the technical term for that variable will be left blank for the added dataset and the user will have to fill in a field name or expression manually. Available fields will be listed in a pull-down in the user interface.

At the same time that the input variable table is created from the dataset metadata, constants may be added to the input variable table, also from the dataset metadata. The system will create constants for all valid and invalid values and all valid and invalid ranges associated with the Validation Spec associated with each Logical or Physical Element.

An example of the logic for determining the business name for a constant is as follows:
  If the valid value (valid range, etc) has a display_name, the display_name will be used as the business name.
  Otherwise, if the valid value (valid range, etc.) has a description, the description will be used as the business name.
  Otherwise, the constant will be included in the variable table without a business name.

It is not necessary to create variables starting with datasets. A second way to create a list of input variables is to identify a Logical Entity in the underlying system. If a Logical Entity is selected, then the system will create a table of variables with one variable for each Logical Element in the Logical Entity. The business names of the variables will be the display_name of the Logical Elements. If the Logical Elements have Validations Specs, constants will also be created using the previous document rules.

Finally, input and output variables can be added manually, either by adding them to them the variable table or by creating them while editing rules. For example, when a user adds a column to a rule, he selects which input variable should be used for that column. But he can also select "new . . . " and create an input variable on the fly. The system will then prompt the user for a datatype and optional comment. No technical name needs to be filled in until later.

The system needs a list of variables in order to allow rules to be edited. However, the mapping between business names and technical names does not have to be completed until later. The mapping may only be needed when the user is ready to either test the entire rule set against an external test file or actually create a transform from the rule set.

Included Rule Sets

In some examples, rule sets can be shared. Specifically, an included rule set is designed to be included inside another rule set so that its logic becomes part of the including rule set's generated transform.

Although included rules sets are usually designed specifically to be shared, an included rule set can also be used standalone to create a transform. For example, a user could create a rule set that computes a Boolean output for a filter-type transform. But at the same time, that rule set could be included inside another transform and the Boolean output (an output variable of the shared rule set, available in the including rule set) could be used to compute a more complex output.

Included rule sets are similar to other types of rule sets. They have input variables and output variables. And they can, themselves, include other included rule sets. But the handling of input and output variables in included rule sets is different than with transform-type rule sets. In transform-type rule sets, the input and output variables are mapped to technical names so a transform can be generated. But in included rule sets, there is no need to map input and output variables to technical names. (If a rule set is both shared and used to generate a transform, then the inputs and output variables will be mapped to technical names for the deployments that generate a transform.)

When a user includes a included rule set into another rule set, the including rule set needs to have variable mapping tables to map the inputs and outputs of the included rule set. In the context of the including rule set, only the input variables and output variables of the shared rule set are visible. Any variables of any rule sets included in the shared rule set are not exposed to the including rule set.

In the context of the including rule set, the input variables of the shared rule set need to be mapped to variables of the including rule set, or expressions using those variables. The business names of the shared rule set will be listed in a variable mapping table, but those names will not be available to be used in rules in the including rule set. Instead, the including rule set may only need to match each input variable (by business name) of shared rule set to an expression in the including rule set.

Included rule sets are considered to be evaluated before input variables, parameters and lookups so the output of an included rule set can be used as the key for a lookup. In some examples, the order of evaluation is more flexible and the ordering of lookups vs. evaluation of included rule sets can be automatically determined based on a dependency analysis. Because included rule sets are evaluated before any output variables are computed, no output variables in the including rule set can be mapped to inputs in the included rule set. If the mapping to an included rule set input cannot be done with a simple input variable, an expression can be used instead.

The mapping to an included rule set input variable can be NULL, as long as input variable in the included rule set is nullable. The mapping can also be left blank. If the mapping is left blank, then an error will be reported at transform generation time, if and only if that input variable is needed in the computation of the including rule set's outputs. In some examples, it is assumed that everything is nullable, which simplifies the user interface.

In the context of the including rule set, the output variables of the shared rule set also need to be mapped to business names in the including rule set. This mapping table is the reverse of the one above. When mapping a shared rule set's input variables, the table maps the business name of the shared rule set's input variable to an existing variable in the including rule set. But when mapping the shared rule set's output variables, the including rule set has a table that specifies a business name for the outputs of the shared rule sets—mapping names in the including rule set to the corresponding names in the shared rule set.

The output variable mapping is needed to resolve potential naming conflicts. The default mapping is to simply use the same business names in both the including rule set and in the shared rule set. But the names of output variables in the shared rule set may conflict with the business names of variables already defined in the including rule set, so the mapped named in the including rule set can be changed.

Not every output from the shared rule set needs to be mapped. If an output is left unmapped, that output cannot be used in the including rule set, and the corresponding logic from the shared rule set will be ignored. On the other hand, all of the inputs from the shared rule set may be mapped, although they can be mapped to uninteresting variables if the rule set designer is sure that they will not be needed. In some examples, the system itself may determine which inputs really need to be mapped.

In some examples, the mapping table is done by business name, not by reference. When a shared rule set is included in another rule set, the including rule set gets a copy of the input and outputs from the shared rule set. These names are stored in the including rule set along with the mapping information. It is possible that the shared rule set gets changed, causing some inputs or outputs to be added, deleted or renamed.

Referential integrity problems between including and included rule sets can be handled by the including rule set when that rule set is loaded from the system. Input variables that disappear from the shared rule set are deleted from the including rule set. Input variables that get added to the shared rule set are added to the mapping table in the including rule set, but remain unmapped. Likewise, output variables that get added to the shared rule set get added to the mapping table in the including rule set, but remain unmapped. If an output variable gets deleted from the shared rule set, and it is not used in the including rule set it is just deleted from the mapping table, but if it is used in the including rule set, the user gets an error that the variable is no longer available.

The including rule set actually persists redundant information from the shared rule sets. Specifically, in the input and output variable mapping table, the including rule set may only need to maintain a list of the business names in the shared rule set along with the corresponding named in the including rule set. For efficiency, the including rule set also persists the type, default value, description and comment, all copied out of the shared rule set. These values are read/only when editing the including rule set but are included for efficiency for generation of reports and other analysis.

The shared rule set mapping tables also have one additional entry in the included rule set, which is an additional comment. This allows users to add another comment to the mapped value.

Lookup Files

Rule sets can optionally have one or more lookup files. Each lookup file in a rule set includes the following information:

1. The Business name of the lookup file.
2. An optional description and comment.
3. A list of the business names for the fields that make up the key. These names are used when the lookup file is added to an expression so the user sees something like this: lookup(My Lookup File, <customer name key>, <account type key>).
4. A list of default expressions for each of the keys.
5. The technical name of the lookup file. In some examples, this can be overridden in the deployment.
6. One or more lookup datasets. Each lookup file is loosely tied to a dataset within the system just like rule sets are tied to input datasets. By default, there is one lookup dataset associated with each lookup file in the rule set, but there can be more lookup datasets for use in alternate deployments.
7. A table of input variables and constants. This is similar to the table of input variables and constants for rule sets except that there is one table for each lookup file. As with input variables, the table of input variables and constants for lookup files can have multiple technical names, corresponding to each of the associated lookup datasets.

Lookup files are handled similar to input variables, except that there may be more than one lookup file. Each lookup file is edited on one page, has a mapping table between business names and technical names and can be associated with multiple datasets. They also have constants associated with each field. The mapping for a lookup file can be initialized by reading the metadata for a lookup dataset in the manner that the metadata for input variables is loaded form an input dataset.

If a user uses a lookup field variable, and the key is not found in the lookup, the value of the field is assumed to be null. Unless the rule case specifically triggers if the field is null, the rule case will evaluate as false and be skipped. In such a case, no error is generated. If a user uses a lookup file variable (the lookup file itself and not a field), then the function lookup_match is assumed so the lookup file variable evaluates to true or false. Both cases apply to rule expressions for either input or output columns. If a user uses a lookup field variable as an output variable default, a failure to find the lookup is translated into a NULL.

Lookup operations, where a key is used to retrieve a one or more data records from a reference file, are slow compared to normal processing. The BRE contains code designed to limit the number of expensive lookup operations by caching the lookup results, for each record. Whenever the rule makes reference to a lookup variable (one of the values that would be returned by a lookup operation), the transform generation process turns the lookup operation into a subroutine call. The subroutine contains a global Boolean, initialized to false at the start of every record, that indicates whether that subroutine has already been called for the current record. The first time the lookup subroutine is called, the Boolean will be false. In this instance, the Boolean is set to true. Then the actual lookup operation is performed and the record returned by the lookup call is cached in a variable. Finally, when testing is enabled, the results of the lookup operation are added to the event log.

Any subsequent lookup operations during the processing of that same record will invoke the same subroutine. However, for subsequent subroutine calls the Boolean will be true. This changes the behavior of the subroutine so that the previously read and cached data can be returned instead of making a redundant lookup operation (and to avoid generating addition log events).

For simplicity, the caching is only done for one key value. If multiple references are made to the same lookup file using different key values (in the same record), only one of those lookup results will be cached. All other lookup subroutine calls will translate into actual lookup operations. That said, a skilled practitioner should see how this could be extended to support multiple lookups with different keys, by using a hash table for the cached results instead of a simple variable.

Parameters

A rule set may refer to parameters. In some examples, each rule set has an optional parameter table, which, like a variable table, maps the business names of parameters to their technical names. Each entry in the parameter table has the following attributes:

1. The business name. This is the name of the parameter, as it will appear in rule bodies. In general parameters can be used anywhere an input variable is used.
2. The technical name. This is the name of the parameter in the development environment.
3. The type of the parameter (string, decimal, date or datetime). In the generated transform, parameters may be converted into other types as needed.
4. An optional description and comment.

Parameters are like variables except that their values are constant across the entire input file, and their values are specified externally when processing starts.

Testing Rules and Logging

Part of generating a transform involves testing the rule to which it will correspond. Rules are also validated, that is, checked for syntax and semantic consistency. In contrast to validation, testing involves execution of the rules and correctness is determined by the user, for example by providing expected output or comparing the output to expected values manually.

The system supports testing at two levels. As described earlier, each rule may have an associated test dataset, in the form of an embedded table of values and expected results. This is referred to as unit testing. When editing a rule, it is possible to re-evaluate the rule's outputs for each line of test data. Any mismatches between actual results and expected results or failures to produce valid results are highlighted for resolution.

In some examples, external input test files are accessible to the server process using standard mechanisms. Testing using external files is referred to as file testing. A test file has a record format that matches the input dataset for the rule set. In some examples, an alternate record format may be provided. Optionally, users can identify a dataset that contains expected results. The system runs the rule set against the test dataset and displays what outputs were produced, and why. If expected results were included, the system compares the actual results against the expected results and lists any records that were different. In some examples, the interface can be extended to allow the user to incrementally retrain individual values.

Some differences between unit testing and file testing include:

1. For lookup files: in unit testing mode, for each test case, the value for each lookup variable is defined as part of the test. No key is specified; when the test runs, the same value is assumed, for each test case, for each lookup variable. A test dataset contains multiple test cases, and each test case can specify a different value for each lookup variable. In file testing mode, real lookup files are used. This means that different keys will return different values, but it also means that the value used for any given lookup variable for a specific key cannot be changed during the test.
2. For included rule sets: in unit testing mode, included rule sets are not executed and do not even have to be complete. Instead, a value is specified in the test dataset for each output from each included rule set. In file testing mode, included rule sets are executed the way they would be executed in production. This implies that any lookup files or parameters needed by the included rule sets also have to be specified at test time.
3. For parameters: in unit testing mode, a different value can be set for each parameter for each test case. In file testing mode, the value of each parameter is constant for the entire test.
4. For the current date: when testing, the user specifies the value that should be assumed for the current date and time, in case the rules refer to the current date or time. In unit testing mode, the date and time can be different for each test case. In file testing mode, a single date and time value is set for the entire test (this value can be different that the date and time of the machine at the time the test is run).
5. For record formats and mappings: no mapping needs to be specified for unit testing; the testing is done entirely based on the business names of variables. For file testing, all the variables are mapped to technical names and the record format for inputs, outputs and lookups is specified.

Figure 3:
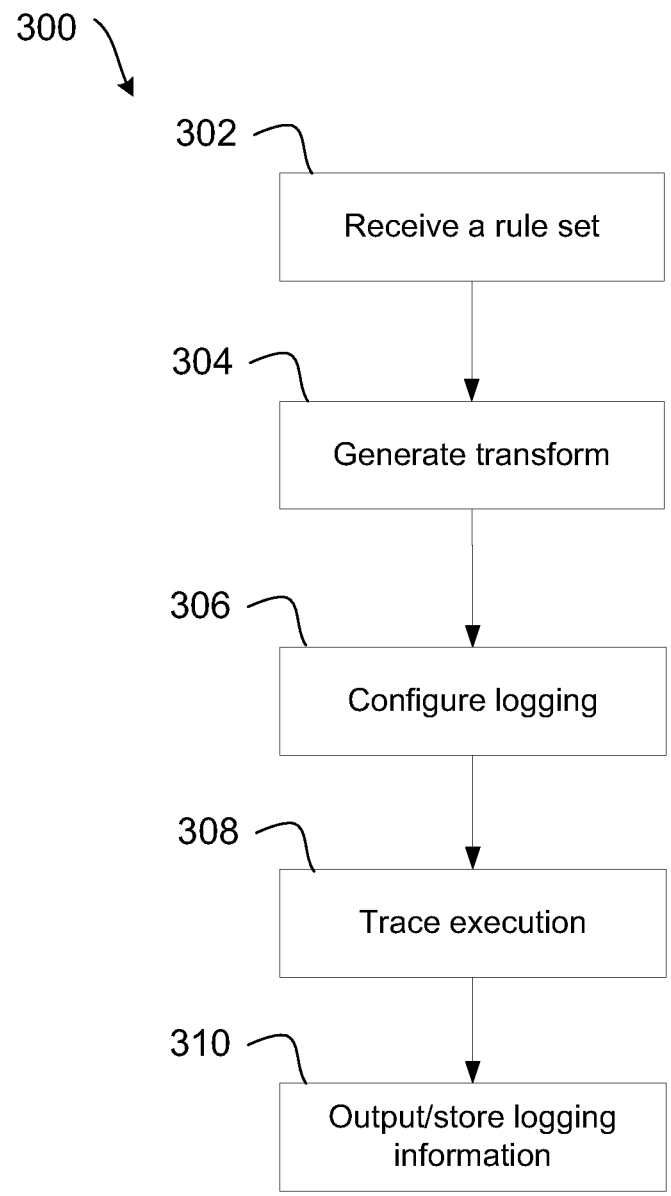
FIG. 3 illustrates a flow chart of some operations of data logging in a graph-based computation environment.

Rule sets are tested and validated with customized logging characteristics as illustrated in the flow chart 300 shown in FIG. 3. One or more rule sets and corresponding test data are received 302 as inputs. The generator generates 304 a transform based on the rule sets and uses it to compute output values for every record in the test data. Optionally, a user is able to configure 306 characteristics of a log that will be generated by tracing execution 308 of a graph-based computation that includes the generated transform. In the graph-based computation, a "log" port of the relevant component is used for testing outputs. A "log" port is an out-of-band communication channel for components. It is a way to get additional output metadata from the transform that does not require changing the record format of the actual output data. The logging information is output 310 from the log ports as log messages that are collected into a log file that is stored in a storage system accessible during execution. Optionally, the log messages can be filtered and a subset of them stored in the log file. For example, the component that includes the generated transform may pass most input records through as output records unchanged (e.g., if no rule cases were triggered for a given input record). It may be desirable to only store log messages corresponding to triggered rule cases that change one or more values in the fields of an input record. One or more components in the graph can filter the records from a log port such that only those log messages are written to the log file.

The transform generated for testing may be slightly different than the transform that would be generated for normal execution. For example, under normal execution, a component that uses the transform may generate a given type of output record at a given output port. At test time, testing related output is sent to the log port, while the output record remains unchanged.

Beginning with the first test case, the inputs of the test case are input into the transform, and the output is written to the output array, together with an indication of which rule generated it. This process repeats for each row until the last row has been evaluated. The output array can then be used to generate the result tables as discussed above. The output array may be is evaluated to determine if the rule set is valid. Output values may be included in the test data for the generated output values from one test may be compared to the values generated in a previous test. Beginning with the first row of the output array, the generated output is compared to the expected output from the test data or previous test results. If any output does not match, the mismatch is logged. This repeats for each row. In some examples, the evaluation steps are integrated into the output-generating steps, and each generated output is compared to the corresponding expected output as it is generated. Any mismatch or other error in processing the test data results is logged. As noted above, the outputs of one rule set may be inputs to another rule set, in which case the included rule set is evaluated as part of the including rule set.

Users can limit the rules that are tested by output field, or by expression which may use input fields. In some examples, a user can choose to disable a rule during testing. In some examples, users do not have to wait for the whole test file to be processed; test results are available as soon as the first few records work their way to the output.

In addition to the test data itself, any of the following information may be traced 308 for file testing and logging:
1. Physical Location of the input dataset. This is stored in the rule set in the input variables table for each input dataset. For join-type datasets, all the Physical Locations are needed. Whenever a physical location is needed, a table name in a database may be used.
2. Record format of the input dataset. By default, this is taken from the dataset definition for the input dataset. There is a place in the input variables to override this with a different record format checked-out into the sandbox. For join-type transforms, all the record formats are needed.
3. Which deployment to use.
4. Physical Location for all lookup files. This is stored in the lookup files table.
5. Record format for each lookup file. Taken from the dataset definition associated with each lookup file, or from an override record format file.
6. Value for each parameter. This will be set in a test parameters dialog.
7. Physical location for the output file. This is only needed when doing regression (comparison) testing. It is stored in the output variables table.
8. Record format for the output file. Once again, only needed when doing regression testing, and taken from the output dataset definition or from an optional override record format file.
9. Location of the project sandbox. Testing must be done out of a sandbox on the host. The sandbox should be a checked-out copy of the project that contains the rule set. All the record format files will be taken from the sandbox.
10. Value to use for the date and time when a rule refers to "now," "today," or similar values.

In this example, the transform does not log cell state by default, however, this function can be activated in a user interface 400, as shown in FIG. 4. That is, users are allowed to configure 306 log characteristics, such as turning on and off logging of various specific criteria. The interface 400 includes a section 410 for specifying when a log message (called a "log record") is created (including for each input record, when an error occurs, or when a specified expression is true), and a section 420 for specifying what is included in each log message (e.g., rule case firings, input values, output values, lookup values, output values form included rulesets, parameter values, and/or results of evaluating each cell). Logging inputs, outputs, etc., slows down execution but only by a small amount. Logging cell state slows down execution considerably, perhaps by as much as an order of magnitude. Testing will be performed and retrieved results will be displayed in accordance with specified configurations.

When not testing and/or logging, the generator can still generate a transform that logs inputs, outputs, etc., and use that transform in production. The enhanced transform generates the same outputs but also generates a series of log messages that can be analyzed, post-execution, to determine which rules were executed. If the user saves 310 the log messages generated in a log file, then the BRE can be used after the fact to replay the execution of the rule set in production, even though no testing input was used. This execution is called playback and it is useful for auditing. The log file contains details of inputs, outputs, lookups, rule cases triggered, etc., as discussed. It also has a header that documents exactly which version of the rule set (name and version) was used to create the transform that created the log file. When run in production, the customer should save the output of the log port into a file (optionally compressed). To playback a session, for auditing, the customer would launch the BRE and then start a playback session. The customer identifies the file containing the session log. The BRE then reads the header, opens the indicated rule set and version, and then processes the rest of the log file as if it was running in file or unit test mode. The display during playback is the same display a user sees after running a file or unit test with exceptions such as the following: (1) there is no comparison against regression data, (2) some information like cell state, will probably be missing from the log so it would not be shown, and (3) because the version of the rule set being shown may not be the current version, the rule set will be read-only during playback.

When the logging function is enabled, the generated transform is modified to include logging statements. Log messages can be generated by making a call to write_to_log( ), a function that outputs an arbitrary string to the log port. When write_to_log is used, data in a specified format is written to the log port. For example, an exemplary log port format is the following:

```
record
    string('|') node;
    string('|') timestamp;
    string('|') component;
    string('|') subcomponent;
    string('|') event_type;
    string('|\n') event_text;
end;
```

The logging information is all stored in the event_text field, which contains the string that is specified in a call to write_to_log( ). The other fields in a log port record are automatically filled in by the component, and are ignored by the BRE.

An example of the format of the event_text (specific to log messages) is the following:

```
record
    decimal('|') count; // number of events
    record
        decimal('|') recNum; // record number, 1 is first record, 0 is legend
        string(1) opCode; // see below
        decimal('|') rule set; // which included rule set, 0 is main rule set
        decimal('|') group; // which input group, which rule, etc.
        decimal('|') index; // input index, output index, rule case, etc.
        string(1) nullFlag; // either a blank or an asterisk ("-") for null
        string('\x01') value; // input value, output value, etc.
    end events[count];
end;
```

The following are exemplary opCodes:
"I" is an input variable.
"O" is an output variable.
"K" is a lookup key.
"L" is a lookup variable.
"R" is a triggered rule case, for non-legend records. For legend records it is a rule.
"C" is a rule cell; it is only used when testing-level tracing is enabled, except for the legend where it is always used.
"P" is a parameter.
"H" is a column heading.
"N" is a rule set name; it is only used in legend records.
"V" is a version number; it is only used in legend records.
"D" is a difference record; it is only used when testing.

In this example, there will be one log message per input record. The log message will contain an array of events. There will be one event per input, per output, per lookup field, per rule case executed, etc. making for a large array of events per input record.

In this example, the value field in log events is not in binary. It does not contain the special characters hex 01 or linefeed since those would incorrectly trigger delimiters between events or log records. Instead, all values are converted into printable strings. Unprintable characters are converted to hex strings (for example, linefeed->"\x0a"). Binary variables are converted to decimal, etc.

Any optimizations in the transform (like using an internal lookup file) may also be disabled, if necessary, to ensure accurate logging.

When the first record is seen, a log message is created that contains details of the corresponding rule set. This is the so called "legend" log message and it is generated once per graph execution for a given rule set. The first portion of the legend log message includes the log format version, as well as the rule set location and version number (needed for playback). Following that will be information that documents the names of each input, output, rule, lookup file, lookup field, parameter, etc. The names are associated with an index (1 is the first input variable, 2 is the second input variable, etc.). This allows subsequent "tracing" log messages associated with events to refer to variables and rules by index, instead of name, to save space in the log file.

After the legend log message is written to the log file, for the first and every subsequent record of a dataflow processed by the graph being logged, any of the following logging events may take place, each associated with a corresponding tracing log message.

(1) If input records are being logged, a log message is created for every input variable documenting the value of those input variables for each input record.

(2) If parameters are being logged, a log message is created for every input variable documenting the value of those parameters.

(3) If there is an included rule set, the rules in the included rule set are run. Those rules will generate log messages according to this logic, recursively.

(4) If case state is being logged, the value for every case in every rule is calculated and logged.

(5) The actual rule logic is executed using chained if-then-else logic or switch statements or internal lookups. As soon as it is known which rule case triggers, a log message is created for the triggered rule case.

(6) Also as soon as it is know which rule case triggers, values are written into the rule's output variables and at the same time, a log message is created for each output (e.g., a value in a transformed record) documenting the assigned value.

(7) Lookup references done while evaluating the rules are handled by a subroutine. The subroutine logic will perform the lookup, then create log messages for every variable read from the lookup file, documenting the value used as a key and the value of all lookup variables found. Then the subroutine will return the lookup value to the main logic. The lookup subroutine will keep a Boolean indicated whether it has already been invoked or not to avoid generating duplicate log events for the same key.

(8) If no rule case triggers, a final else clause (or default clause for the switch statement) will be executed to assign the default output values. At the same time, log messages will be created for each output documenting the assigned value.

The logging information provided from the log ports can be used in a variety of ways. For example, in some cases, the number of input records associated with a dataset used as a test dataset may be larger than is desirable for a given scenario, such as a test dataset for use in testing a rule set of a data processing component in a graph. Logging information from the log ports can be processed by components of the graph during an initial execution of the graph. These components can examine the logging information to determine the minimum set of input records needed to provide at least one tracing log message for each rule case in the rules of the rule set. For example, the components identify the first input record for which each case in each rule is triggered. Then those identified records are stored in association with a reduced test dataset, in which all other input records have been filtered out. The reduced test dataset still enables testing of the same rules and rule cases in the rule set, but may be much smaller and more efficiently used for testing.

Overlap Analysis

In some examples, as mentioned above, when the user runs the test dataset against the rule set, every rule that triggered can be tracked, that is, rule cases that had all their input conditions met and would have produced output if a higher-priority rule case had not also had all its input conditions met. After processing the test data, the system can post-process the test output data and generate a list of every rule or rule case that was not triggered by any of the test cases. This information can be overlaid on the display of rules in the editor to quickly show the user which rules were or were not triggered. From this information, the user can look for possible rules that are obscured by other rules, that is, rules which overlap. Counts can also be shown for each rule case. Counts can be as useful as just knowing whether a rule case triggered, especially for tuning values to achieve a desired distribution of outputs and for identifying the most likely rule cases for adjusting performance.

Transform Generation

Business rules are evaluated in an application (graph) by converting each rule set into a transform. The transform is then attached to a component in a graph. Such components may be subgraphs that contain a set of standard components linked in a particular way to execute the transform. These subgraphs can then be used with additional components, for example to use keys for joins and rollups.

Transform code can be generated from business rules in multiple ways. In examples in which the internals of the transforms are not designed to be user-edited, the generation process can result in transforms that are difficult to comprehend, but which implement the rules more efficiently than applying the rules one-by-one. In some cases, specialized lookup files or other technologies may be used to improve performance of the generated transform. Some details of how a transform is generated can be stored in a deployment. A rule set that may be used in multiple graphs may have multiple deployments for its different possible users. A rule set may also contain a super set of rules, only some of which are required in each deployment, with the deployment identifying which rules to use when the transform is generated. If the rule has a lot of constant values, with few (if any) expressions, then instead of if then else logic, a lookup table can be used. In this case, the lookup table is part of the rule (not saved separately). For example, consider this rule:

| From City | Dest City | Class of Service | expression | Frequent Flyer Miles (output) |
|---|---|---|---|---|
| BOS | LAX | First | | 6000 |
| BOS | LAX | Business | | 3000 |

| From City | Dest City | Class of Service | expression | Frequent Flyer Miles (output) |
|---|---|---|---|---|
| BOS | LAX | Coach | Is Using Miles = yes | 0 |
| BOS | LAX | Coach | else | 3000 |
| BOS | CHI | First | | 2000 |
| BOS | CHI | Coach | | 1000 |
| BOS | NYC | First | | 1500 |
| BOS | NYC | Business | | 1000 |
| BOS | NYC | Coach | | 500 |

This rule is handled by building an in-memory lookup table with the following information:

| from | dest | class | expr | miles |
|---|---|---|---|---|
| BOS | LAX | 1 | 0 | 6000 |
| BOS | LAX | 2 | 0 | 3000 |
| BOS | LAX | 3 | 1 | 3000 |
| BOS | CHI | 1 | 0 | 2000 |
| BOS | CHI | 2 | 0 | 1000 |
| BOS | NYC | 1 | 0 | 1500 |
| BOS | NYC | 2 | 0 | 1000 |
| BOS | NYC | 3 | 0 | 500 |

Then the transform is something like this:

```
int expr = lookup(from, dest, class).expr
int miles = lookup(from, dest, class).miles
if (expr == 1 and is_using_miles) miles = 0
return miles;
```

Each rule set has a deployment table which is adapted to map a name to details about the configuration of that deployment. Referring to FIG. 4, users that wish to log specific execution information can input each entry in a graphical user interface in accordance with the attributes defined in the deployment table of each rule set:

1. Deployment name. An arbitrary string that must be unique within the rule set.
2. Input dataset name. If there are multiple input datasets listed in the input variable table, then each entry in the deployment table indicates which input dataset is used for that deployment.
3. Output dataset name. If there are multiple output datasets listed in the output variable table, then each entry in the deployment table indicates which output dataset is used for that deployment.
4. Deployment name for each included rule set. For each included rule set, we need to indicate which deployment should be used for each corresponding deployment of the including rule set.
5. Target location for the component and the transform file to be generated.

In some examples, there is always at least one deployment, named default. This is the deployment that is used when no other deployment is specified.

Here are the basics of transform generation, in one exemplary embodiment. First, rules are generated for outputs that are computed in the rule set. All other outputs will be handled with a wildcard rule in the transform. In general, output variables that are only used internally cause local variables to be created in the generated transform. That said, the generated transform may include more local variables, as necessary, to avoid duplicated calculations (for example, if optimizing is for speed over space).

There are some transform differences depending on the transform type:

Reformat—The input is called "in0," and input variables may have technical names like "in.field." The output is called "out," and output variables may have technical names like "outfield."

Join—The two inputs are called "in0" and "in1." The output is called "out," and the wildcard rule assumes that in0 is copied to "out." All the parameters may be set when the component is generated. The rule set will have multiple sets of inputs, one for each input to the join. The rule set will also specify the join type, whether inputs should be de-duped, and the business name of the fields used as the key to the join (in some examples, this must be present in each input set). Also, user may be allowed to specify an expression for each input that is used as an input filter.

Rollup—The input is called "in0" and the output is called "out." In the case of a rollup-type rule set, the user is allowed to use the aggregation functions (which are not supported in other transform types). If the user creates an output variable whose technical name is "input_select" or "output_select," then an "input_select" and/or "output_select" function is added to the transform with the logic of the rules that compute those outputs. The input of both of those functions is called "in0" (even though output_select usually names its parameter "out"). As in the join type, all the parameters may be set when the component is generated.

Filter—One of two predefined constants is output. The only output variable for a Filter-type transform is "select," of type component, which is non-zero and non-NULL to pass the output. In some examples, this is implemented as a reformat component in a subgraph.

Additional transform types may also be implemented:

Scan—For scan-type rule sets, a user can specify that the values of one or more outputs be remembered between records. The values for these outputs will be computed normally, for every record. However, additional built-in inputs will be created for each of those outputs containing the value of those outputs from the last record. This allows users to, for example, compute the sum of a field across multiple records, by storing the partial sum in an output variable whose state is then available as an input in the next record.

In addition, for scan-type rule sets, users can specify an optional key. The key is one or more fields that are used to group records. When a key is specified for a scan-type rule set, the state of all outputs remembered between records will be different for each unique value of the key. For example, if the key is a customer number, and one output is used to compute a sum of all the transactions for each customer, then under the covers, then one partial sum will be saved for every unique customer number, so a different sum could be computed for each customer.

Classification—A rule has N outputs and the transform decides which output should be used for each record. For this component, the system creates a out::classify (in) function. The output is a single integer value, indicating which output port (there can be more than one) should be used. An output of 0 means the zeroth port, an output of 1 means the first port, etc. The only output variable for a Classification-type transform is "select," of type component, which will be the index of the output port (zero-based). This is similar to a filter except that N values are used instead of two for the output.

Function—A function-type rule set can be turned into a transform file, but not as a component transform. Instead, when a function-type rule set is turned into a transform, the constructed transform file is designed to be included in other transforms. Each output variable is turned into a function. The inputs for those functions depend on the type of rule. For a function-type rule, the inputs are the inputs to the rule in the order listed in the table. For non-function-type rules, each output function takes a single input, named in, that is a record with all the fields corresponding to the input variables.

When a rule set is used to generate a transform that will in turn be part of a graph, the graph component includes the name of the rule set and a deployment. A graph developer can then edit the rule set instead of the generated transform in the component. Changes to the rule set cause the transform to be regenerated. In some examples, a user can shift-double click on the component that was generated by the BRE. The shift-double click causes a Graphical Develop Environment (GDE) to launch the BRE, passing in the EME name, rule set name and deployment. In one example, command line interface can be used to launch each BRE process; however, different inter-process communication mechanism can also be employed.

The logging approach described above can be implemented using software for execution on a computer system. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method, including:
   receiving at least one rule specification, that specifies criteria for determining one or more output values that depend on input data;
   providing an interface for identifying conditions for generating log messages;
   generating output records by transforming input data according to the rule, including:
       determining that at least one of the conditions has occurred,
       tracing the transforming, and
       in response to determining that at least one of the conditions has occurred, generating log messages based on the tracing, the log messages including information not included in the output records;
   providing the output records on a first channel; and
   providing the log messages on a second channel different from the first channel.

2. The method of claim 1 in which at least one of the conditions is associated with transforming records in the input data according to a rule associated with the received rule specification.

3. The method of claim 2 in which the at least one of the conditions includes identifying an error in a record to be transformed.

4. The method of claim 2 in which the at least one of the conditions includes satisfying a condition of a rule case for a given record.

5. The method of claim 4 in which satisfying a condition of the rule case for a given record includes satisfying a logical expression based on values in the given record.

6. The method of claim 4 in which satisfying a condition of a rule case for a given record includes comparing values in the record to values associated with the rule case.

7. The method of claim 1 in which generating log messages includes:
   generating one or more legend log messages each including details of a rule set containing the rules defined by the received rule specification, and
   generating multiple tracing log messages, where each tracing log message is associated with a legend record and describes at least one event associated with transforming records in the input data according to a rule associated with the received rule specification.

8. The method of claim 7 in which a tracing log message that describes the event describes at least one input or output of a data processing component using an index in the legend record.

9. The method of claim 7 in which generating one or more legend messages includes generating one legend message per execution of a graph-based computation.

10. The method of claim 1 further including generating log messages for each rule for which the specified criteria are satisfied.

11. The method of claim 1 in which providing the log messages on a second channel includes outputting log messages from a log port of one or more data processing components.

12. The method of claim 11 in which providing the log messages on a second channel further includes receiving log messages from the log port in a data processing component and storing log information derived at least in part from the log messages.

13. The method of claim 12 further including filtering the received log messages and storing log information derived from a subset of the log messages.

14. The method of claim 11 further including:
   receiving log messages from the log port in a data processing component that indicate rule for which the specified criteria are satisfied,
   examining the log messages to determine a reduced set of input records that provide at least one log message for each rule case of each of the rules defined by the rule specification that is triggered by all of the input records, and
   storing the reduced set of input records.

15. A computer system, including:
   a storage system storing at least one rule specification, that specifies criteria for determining one or more output values that depend on input data;
   an interface for identifying conditions for generating log messages; and
   a computation system configured to:
       generate output records by transforming input data according to the rule, including:
           determining that at least one of the conditions has occurred,
           tracing the transforming, and
           generating, in response to determining that at least one of the conditions has occurred, log messages based on the tracing, the log messages including information not included in the output records;
       provide the output records on a first channel; and
       provide the log messages on a second channel different from the first channel.

16. The computer system of claim 15 in which at least one of the conditions is associated with transforming records in the input data according to a rule associated with the received rule specification.

17. The computer system of claim 16 in which the at least one of the conditions includes identifying an error in a record to be transformed.

18. The computer system of claim 16 in which the at least one of the conditions includes satisfying a condition of a rule case for a given record.

19. The computer system of claim 18 in which satisfying a condition of the rule case for a given record includes satisfying a logical expression based on values in the given record.

20. The computer system of claim 18 in which satisfying a condition of a rule case for a given record includes comparing values in the record to values associated with the rule case.

21. The computer system of claim 15 in which generating log messages includes:
   generating one or more legend log messages each including details of a rule set containing the rules defined by the received rule specification, and
   generating multiple tracing log messages, where each tracing log message is associated with a legend record and describes at least one event associated with transforming records in the input data according to a rule associated with the received rule specification.

22. The computer system of claim 21 in which a tracing log message that describes the event describes at least one input or output of a data processing component using an index in the legend record.

23. The computer system of claim 21 in which generating one or more legend messages includes generating one legend message per execution of a graph-based computation.

24. The computer system of claim 15 in which the computer system is further configured to generate log messages for each rule case for which the specified criteria are satisfied.

25. The computer system of claim 15 in which providing the log messages on a second channel includes outputting log messages from a log port of one or more data processing components.

26. The computer system of claim 25 in which providing the log messages on a second channel further includes receiving log messages from the log port in a data processing component and storing log information derived at least in part from the log messages.

27. The computer system of claim 26 in which the computer system is further configured to filter the received log messages and store log information derived from a subset of the log messages.

28. The computer system of claim 25 in which the computer system is further configured to:
  receive log messages from the log port in a data processing component that indicate rule for which the specified criteria are satisfied,
  examine the log messages to determine a reduced set of input records that provide at least one log message for each rule case of each of the rules defined by the rule specification that is triggered by all of the input records, and
  store the reduced set of input records.

29. A computer program, stored on a non-transitory computer-readable medium, the computer program including instructions for causing a computer system to:
  receive at least one rule specification, that specifies criteria for determining one or more output values that depend on input data;
  provide an interface for identifying conditions for generating log messages;
  generate output records by transforming input data according to the rule, including:
    determining that at least one of the conditions has occurred,
    tracing the transforming, and
    in response to determining that at least one of the conditions has occurred, generating log messages based on the tracing, the log messages including information not included in the output records;
  provide the output records on a first channel; and
  provide the log messages on a second channel different from the first channel.

30. The computer program of claim 29 in which at least one of the conditions is associated with transforming records in the input data according to a rule associated with the received rule specification.

31. The computer program of claim 30 in which the at least one of the conditions includes identifying an error in a record to be transformed.

32. The computer program of claim 30 in which the at least one of the conditions includes satisfying a condition of a rule case for a given record.

33. The computer program of claim 32 in which satisfying a condition of the rule case for a given record includes satisfying a logical expression based on values in the given record.

34. The computer program of claim 32 in which satisfying a condition of a rule case for a given record includes comparing values in the record to values associated with the rule case.

35. The computer program of claim 29 in which generating log messages includes:
  generating one or more legend log messages each including details of a rule set containing the rules defined by the received rule specification, and
  generating multiple tracing log messages, where each tracing log message is associated with a legend record and describes at least one event associated with transforming records in the input data according to a rule associated with the received rule specification.

36. The computer program of claim 35 in which a tracing log message that describes the event describes at least one input or output of a data processing component using an index in the legend record.

37. The computer program of claim 35 in which generating one or more legend messages includes generating one legend message per execution of a graph-based computation.

38. The computer program of claim 29 further including instructions for causing the computer system to generate log messages for each rule case for which the specified criteria are satisfied.

39. The computer program of claim 29 in which providing the log messages on a second channel includes outputting log messages from a log port of one or more data processing components.

40. The computer program of claim 39 in which providing the log messages on a second channel further includes receiving log messages from the log port in a data processing component and storing log information derived at least in part from the log messages.

41. The computer program of claim 40 further including instructions for causing the computer system to filter the received log messages and store log information derived from a subset of the log messages.

42. The computer program of claim 39 further including instructions for causing the computer system to:
  receive log messages from the log port in a data processing component that indicate rule for which the specified criteria are satisfied,
  examine the log messages to determine a reduced set of input records that provide at least one log message for each rule case of each of the rules defined by the rule specification that is triggered by all of the input records, and
  store the reduced set of input records.

43. A computer system, including:
  at least one processor;
  means for receiving at least one rule specification, that specifies criteria for determining one or more output values that depend on input data;
  means for providing an interface for identifying conditions for generating log messages;
  means for generating output records by transforming input data according to the rule, including:
    determining that at least one of the conditions has occurred,
    tracing the transforming, and in response to determining that at least one of the conditions has occurred, generating log messages based on the tracing, the log messages including information not included in the output records;

means for providing the output records on a first channel; and means for providing the log messages on a second channel different from the first channel.

* * * * *